United States Patent [19]

Kupsky

[11] E Re. 28,683

[45] Reissued Jan. 13, 1976

[54] GASEOUS DISCHARGE DISPLAY PANEL WITH AUXILIARY EXCITATION CELLS

[75] Inventor: George A. Kupsky, State College, Pa.

[73] Assignee: Burroughs Corporation, Detroit, Mich.

[22] Filed: Feb. 15, 1974

[21] Appl. No.: 443,067

Related U.S. Patent Documents

Reissue of:

[64] Patent No.: 3,644,925
Issued: Feb. 22, 1972
Appl. No.: 791,208
Filed: Jan. 7, 1969

[52] U.S. Cl. ..... 340/378 R; 313/197; 313/208; 313/514; 315/169 TV; 340/324 M

[51] Int. Cl.[2] ..... H01J 17/30

[58] Field of Search ..... 178/7.3 D, 7.5 D; 313/208, 313/197, 210, 108 B, 108 C, 188; 315/169 R, 169 TV, 249; 340/373, 378 R, 343, 344, 324 M

[56] References Cited

UNITED STATES PATENTS

| | | | |
|---|---|---|---|
| 2,921,236 | 1/1960 | Gawehn | 315/168 |
| 2,925,530 | 2/1960 | Engelbart | 315/84.6 |
| 3,114,860 | 12/1963 | Stutsman | 315/169 |
| 3,242,378 | 3/1966 | Kobayashi | 315/84.6 |
| 3,499,167 | 3/1970 | Baker et al. | 313/188 |
| 3,509,407 | 4/1970 | Cullis, Jr. | 313/201 |
| 3,509,421 | 4/1970 | Holz | 315/150 |

*Primary Examiner*—Robert L. Richardson
*Attorney, Agent, or Firm*—Kenneth L. Miller; Robert A. Green

[57] ABSTRACT

A display panel comprising a plurality of gas-filled cells, each having a pair of energizing electrodes and adapted to be energized in groups to display characters. The panel also includes a plurality of cells which are adapted to be energized so that they glow continuously and facilitate the turning on of the groups of cells which are used to display a character. These auxiliary energizing cells are hidden from view so that they perform their function without being seen and without interfering with viewing of the primary characters.

32 Claims, 7 Drawing Figures

INVENTOR
GEORGE A. KUPSKY

BY Robert G. Green

ATTORNEY

FIG. 4
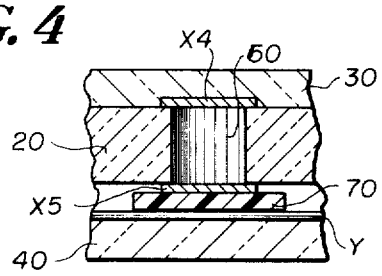
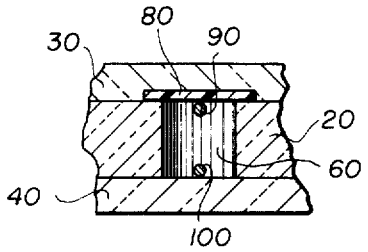
FIG. 5
FIG. 6
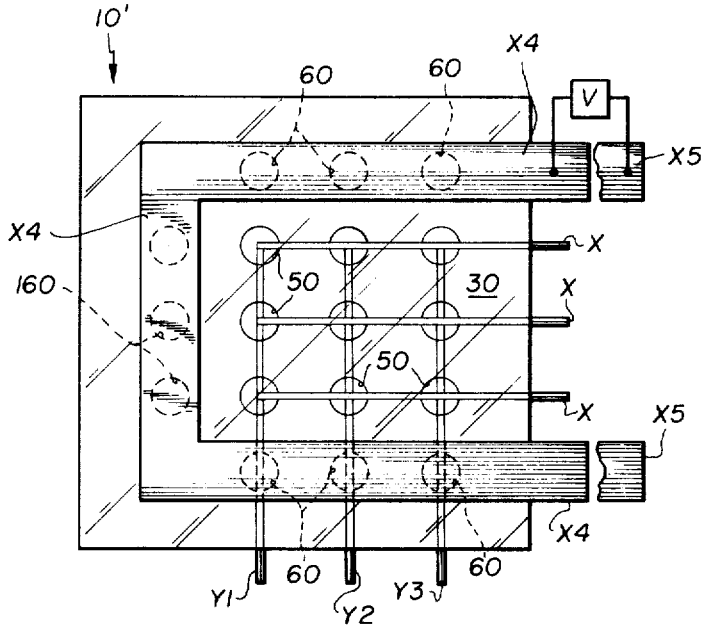
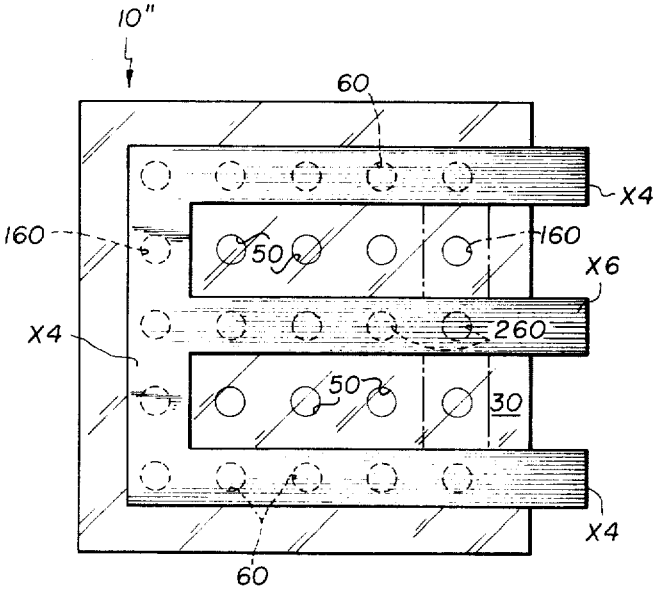
FIG. 7
INVENTOR
GEORGE A. KUPSKY
BY Robert A. Green
ATTORNEY

GASEOUS DISCHARGE DISPLAY PANEL WITH AUXILIARY EXCITATION CELLS

Matter enclosed in heavy brackets [ ] appears in the original patent but forms no part of this reissue specification; matter printed in italics indicates the additions made by reissue.

BACKGROUND OF THE INVENTION

Display panels comprising large numbers of light-producing cells, particularly gas-filled cells, have been known in the art for some time. However, up to the present time, the necessary inventions have not been made to convert these devices from the theoretical or laboratory state to the practical commercial state. In gas-filled devices which are intended to be caused to glow to display characters, a voltage is applied across selected cells to provide the desired breakdown and glow. The breakdown and glow-producing process is generally considered to require the presence in the gas of at least one electron to initiate the required collisions and energy interchanges which produce glow.

The initiating electron(s) are not, relatively speaking, easy to obtain, but they can be obtained, for example, by field emission or photoemission. However, these methods are not sufficiently fast or easy to carry out when it is desired to enter and change information in a display panel at relatively high speed.

SUMMARY OF THE INVENTION

Briefly, the invention comprises providing, in an operating display panel, auxiliary cells which glow without being seen and provide electrons or ions which facilitate the turning on of cells which are intended to display information.

DESCRIPTION OF THE DRAWINGS

FIG. 4 is a sectional view of a portion of the device of FIG. 3;

FIG. 5 is a sectional view showing a modification of the invention;

FIG. 6 is a plan view of another modification of the invention; and

FIG. 7 is a plan view of still another modification of the invention.

DESCRIPTION OF THE PREFERRED EMBODIMENTS

The principles of the invention are applicable to display devices of many types, some of which are described and claimed in a copending application of G. A. Kupsky, Ser. No. 764,984, now abandoned. Devices of this type are shown and described herein in only enough detail to illustrate the invention. Details of manufacturing and assembly operations are omitted.

Figure 1:
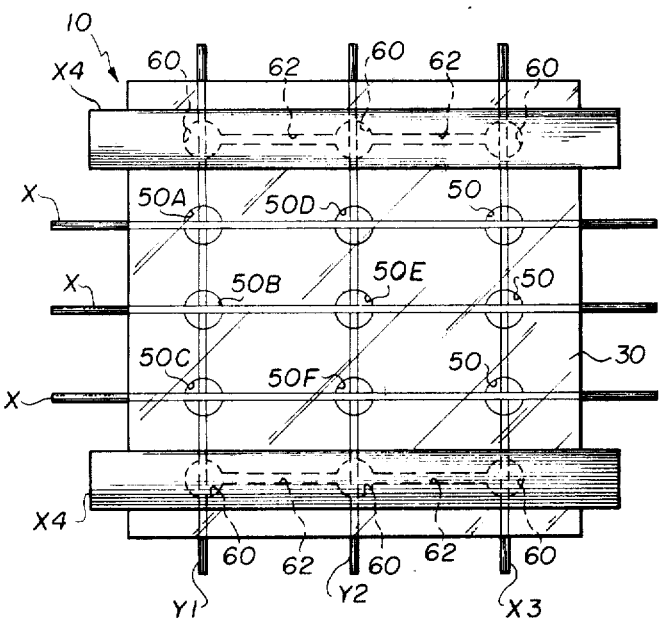
FIG. 1 is a plan view of a display panel embodying the invention.
Figure 2:
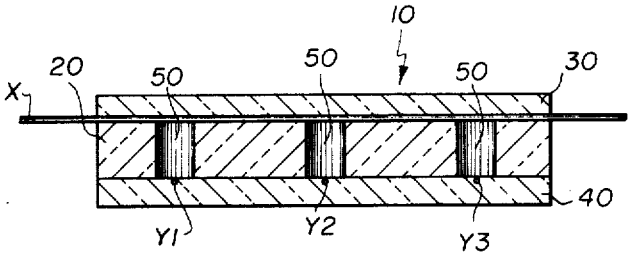
FIG. 2 is a sectional view of the device of FIG. 1 showing display cells and their electrodes.

Referring to the drawings and to FIGS. 1 and 2, a display device or panel 10 comprises a sandwich of plates including an insulating central plate 20 of glass or ceramic, a top glass plate 30 which is a viewing window, and a bottom glass plate 40. The center plate has apertures or cells 50 arrayed in rows and columns, and a row electrode X is provided in contact with the top surface of the central plate in operative relation with each row of cells, and a column electrode Y is provided in contact with the bottom surface of the central plate and in operative relation with each column of cells. The cells 50 are intended to display information, and they define an information display or viewing area.

The top electrodes, that is, the row electrodes X in FIG. 1, are designed so that the glow in cells 50 is not obstructed by them. For this purpose, these electrodes are flat strips having apertures aligned with the cells, or they are thin wires which do not entirely cover the cells, or they may be strips offset so that they only partially cover the cells, or they may be transparent electrode films which may be formed on the top glass plate. Any other suitable expedient may also be employed.

The cells 50 are filled with a suitable gas such as neon, argon, or a mixture of these at any suitable pressure, for example, 20 to 100 Torr at room temperature.

In operation of the panel 10, selected cells 50 can be caused to glow by the application of suitable voltages between the row and column electrodes associated with the selected cells. Without the provision of some means for providing the first electron in the cells to cause the cells to turn on, such means being, for example, an external source of ultraviolet light, the turn-on time for each cell is often undesirably long. According to the invention, this problem is overcome by the provision of auxiliary rows of cells 60 positioned outside the area occupied by cells 50 which are intended for use in displaying characters. In FIG. 1, two rows of auxiliary cells 60 are shown, one along the upper margin of panel 10 and one along the lower margin of the panel. The auxiliary cells 60 have row electrodes X4 and X5 and the same column electrodes as the column cells with which each is aligned.

The auxiliary cells 60 are arranged so that they glow, but without the glow being seen by a viewer. These cells 60 thus serve as a source of charged particles such as electrons or ions which find their way between the center plate and the other plates to the other cells to thereby facilitate their turning on. The auxiliary cells 60 may be hidden from view, for example, by having their top electrodes in the form of strips which are wide enough to cover the cells so that they cannot be seen by a viewer. To facilitate their operation, it might be desirable to interconnect cells 60 by channels 62 illustrated in FIG. 1.

Other expedients might also be employed to hide cells 60 from view. For example, the portions of top glass plate 40 which cover cells 60 might be painted black, or a layer of some plastic might be cemented on the top or bottom surface of the top plate. In either case then, the top electrode associated with cells 60 need not also conceal the cells.

In one mode of operation of panel 10, the column cells are scanned or energized from left to right, as illustrated in FIG. 1, at a rate which makes information appear to be stationary. This is achieved by applying energizing potentials to electrodes Y1, Y2, Y3...Yn in turn, and, as each Y electrode is energized, appropriate information-representing potentials are applied to the X electrodes to turn on the proper cells in the column of cells associated with the energized Y electrode.

Thus, for example, when electrode Y1 is energized, suitable information signals are supplied to the appropriate X electrodes to turn on cells 50A and 50C. Then when electrode Y2 is energized, the information signals on the X lines are changed so that, say, cell 50E is turned on, etc. This scanning operation is carried out at a rate which keeps the selected cells ON and displaying a character or message for a time until the input information is changed and the display is changed. However, operating turn-on potentials are applied continuously to lines X4 as the Y lines are energized to turn on the auxiliary cells 60 in each column, and thus to provide a source of ionic stimulation for the display cells 50.

Figure 3:
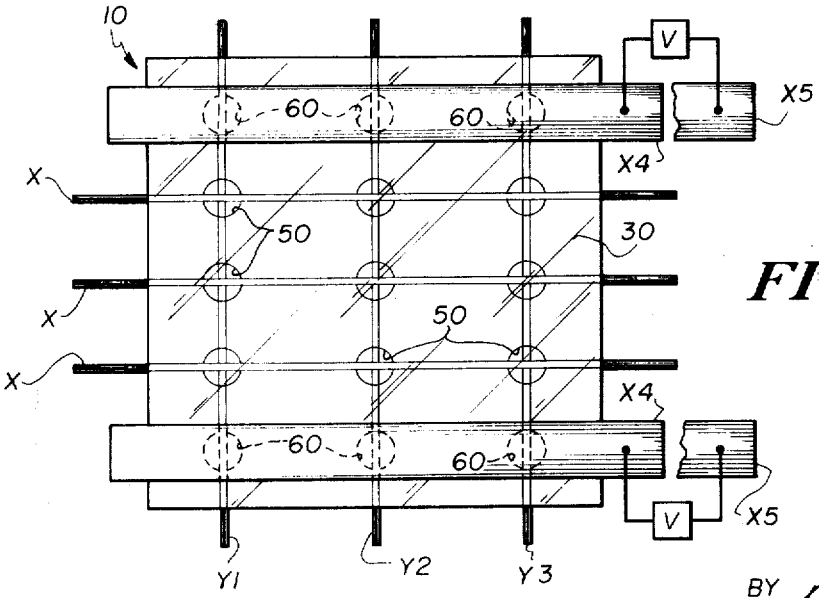
FIG. 3 is a plan view of a modification of the invention.

The auxiliary cells 60 may be separated electrically from the cells 50 by not using the Y electrodes as common electrodes as described above, but by having a second electrode for operation with electrodes X4 to turn on cells 60. As shown in FIGS. 3 and 4, the second electrode can be a row electrode X5 positioned between the center plate and bottom plate and aligned with cells 60 paralleled to electrodes X4. The second electrodes X5 are suitably insulated from the Y electrodes which pass through the area by means of insulating coatings or strips 70 where needed. Of course, the Y electrodes need extend across only one set of cells 60 and out of the panel 10 to provide external connection thereto.

Electrodes X4 and X5 and their cells 60 are energized by a separate signal source V connected between them. The source V may provide an AC signal synchronized with the scanning signal, or it may be a DC voltage which holds cells 60 on continuously.

In another concealing arrangement illustrated in FIG. 5, an insulating strip 80 is placed on the top surface of plate 20 over each row of cells 60, and electrode wires 90 and 100 are seated in slots in the top and bottom surfaces of center plate 20 and extending along the rows of auxiliary cells 60. As described above with respect to FIG. 3, either an AC or DC signal may be applied to electrodes 90 and 100 to operate auxiliary cells 60.

In another modification of the invention shown in FIG. 6, a panel 10' includes the upper and lower rows of auxiliary cells 60 as described above, and, in addition, a column of auxiliary cells 160 positioned ahead of the first column of cells 50 viewed in a scanning operation. In FIG. 6, the column of auxiliary cells 160 is positioned at the left-hand edge of the panel, and it is assumed that the scanning operation proceeds from left to right.

Any suitable arrangement may be used to conceal and to energize the column of auxiliary cells 160. One convenient construction is similar to that shown in FIG. 3, and, in effect, converts the individual row electrodes X4 and X5 to U-shaped electrodes which are aligned with cells 60 and 160. The usual row and column electrodes X and Y are provided for the other cells 30, with insulation being provided between the various electrodes where required. As above, signal source V is connected between the U-shaped electrodes X4 and X5 associated with the rows and columns of auxiliary cells.

The rows of cells 60 perform the function described above, and, in addition, the column of auxiliary cells 160 facilitate the starting of a new scanning cycle after all of the cells have been cycled from left to right. The cycle is begun again by having the column of auxiliary cells 160 turn on, and this provides the stimulus for the next adjacent column of cells 50 which are the first cells to carry visible information. As described above, the auxiliary cells 60 and 160 might be held on continuously or cycled.

In still another modification of the invention, illustrated in FIG. 7, it might be desirable to have rows or columns of auxiliary cells interspersed among the display cells 50 throughout the panel. In panel 10'' shown in FIG. 7, a row of auxiliary cells 260 is shown with an electrode X6 connected to U-shaped electrode X4. The required associated electrode for cells 260 is provided even though it cannot be seen in FIG. 7. This type of construction would normally be used in a large panel having many cells.

In another modification of the invention illustrated in FIG. 7, a second column of auxiliary cells 160 and its electrodes are provided along the right-hand margin of the area occupied by the display cells 50. Thus, a ring of auxiliary cells is provided completely surrounding the display cells 50. With this arrangement, and particularly if intermediate auxiliary cells 260 are provided in a display panel, the turn-on of cells anywhere in the panel is facilitated. Thus, a scanning operation or entry of static information need not originate at a margin of a panel immediately adjacent to auxiliary cells, but can originate anywhere in the panel with ease.

What is claimed is:

1. A flat panel display device comprising a gas-filled envelope including an insulating center plate and top and bottom insulating plates all sealed together vacuumtight along their adjacent peripheries, said center plate comprising a solid sheet having a plurality of discrete apertures, each forming a gaseous display cell, said cells being arrayed in rows and columns, the walls of said display cells being free of material which can generate excited particles and in the same physical state as other portions of the surface of said center plate, a row electrode aligned with each row of display cells and a column electrode aligned with each column of display cells, said display cells being adapted to be fired by the application of operating potentials to selected ones of said row and column electrodes,

*conductive means attached to said column electrodes for scanning said display cells one column after the next, while potentials are selectively applied to said row electrodes,* a plurality of auxiliary discrete gas-filled cells adapted to glow at a low level, not for viewing, but to provide excited particles for firing said [first] *display* cells, the walls of said auxiliary cells being free of material which can generate excited particles and in the same physical state as other portions of the surface of said center plate, each auxiliary cell being aligned with and in operative relation with a column of said [first] *display* cells, each column electrode also being in operative relation with one of said auxiliary cells, and an auxiliary row electrode in operative relation with each of said auxiliary cells, said auxiliary electrode and said column electrodes being usable to fire each of said auxiliary cells to cause the gas therein to glow and to generate excited particles, said excited particles diffusing to adjacent display cells and energizing the gas therein to facilitate the firing of said display cells when operating potentials are applied thereto.

2. The panel defined in claim 1 wherein said auxiliary cells are arrayed in a series and each auxiliary cell is coupled to the adjacent auxiliary cell by a gas communication path whereby when one auxiliary cell is ON, it provides excited particles which diffuse to the adjacent auxiliary cell and facilitate its turning ON.

3. The panel defined in claim 1 wherein said auxiliary electrode is an opaque electrode which overlays said auxiliary cells and prevents light from said auxiliary cells from being seen by a viewer.

4. The device defined in claim 1 and including an auxiliary cell aligned with each row of [ first ] *display* cells.

5. A flat panel display device comprising an insulating center plate having generally flat top and bottom surfaces and including a plurality of first gas-filled cells arrayed in rows and columns, said first cells comprising display cells for displaying information and occupying an information display area, said cells being mechanically separate from each other, the walls of said first cells being free of material which can generate excited particles and in the same physical state as other portions of the surface of said center plate, an insulating base plate having a relatively flat top surface and secured along its periphery to a peripheral portion of said center plate, the adjacent portions of the top of said base plate and the bottom surface of said center plate being in intimate contact with each other but not in gastight engagement, a top plate being secured to said center plate along their adjacent margins with the bottom surface of said top plate in intimate engagement but not in gastight engagement with the top surface of said center plate, there thus being minimal spacing between said center plate and the adjacent top and bottom plates, said spacing being too narrow to permit a mass flow of gas but permitting passage of charged particles of gas, a plurality of auxiliary gas-filled cells spaced from said first cells and having electrode means for producing glow at a level suitable not for viewing but to provide charged particles for said first cells, the walls of said auxiliary cells being free of material which can generate excited particles and in the same physical state as other portions of the surface of said center plate, said electrode means associated with said auxiliary cells being usable to fire each of said auxiliary cells selectively to cause the gas therein to glow and to generate excited particles, said excited particles diffusing to adjacent display cells and energizing the gas therein to facilitate the firing of said display cells when operating potentials are applied thereto, said excited particles diffusing from an auxiliary cell when it is ON to a first cell through the spacing between said center plate and said top and bottom plates, said auxiliary cells each being aligned with a column of said first cells, at least two electrodes associated with each of said first cells, and at least two electrodes in said electrode means associated with each of said auxiliary cells, at least one of said last two electrodes being positioned to conceal said auxiliary cells from view.

6. A flat panel display device comprising a gas-filled envelope including an insulating center plate and top and bottom insulating plates all sealed together in vacuumtight engagement along their adjacent peripheries, said center plate comprising a solid sheet of insulating material having a plurality of discrete [ appertures ] *apertures*, each forming a gaseous display cell, said cells being arrayed in rows and columns, the walls of said cells being free of material which can generate excited particles, said walls being in the same physical state as other portions of the surface of said center plate, a row electrode aligned with each row of display cells and a column electrode aligned with each column of display cells, each row electrode crossing each column electrode, each crossing being at one of said display cells whereby each display cell can be fired by the application of electrical potential to the two electrodes associated with it, [ and ]

*conductive means attached to said column electrodes for scanning said display cells one column after the next, while potentials are selectively applied to said row electrodes, and* a plurality of auxiliary discrete gas-filled keep-alive cells positioned adjacent to said display cells and having operating electrodes and adapted to glow at a level, not necessarily suitable for viewing, but suitable to provide excited particles for firing said first cells, the walls of said auxiliary cells being free of material which can generate excited particles, said walls being in the same physical state as other portions of the surface of said center plate, said operating electrodes of said auxiliary cells usable to fire each of said auxiliary cells to cause the gas therein to glow and to generate excited particles, said excited particles diffusing to adjacent display cells and energizing the gas therein to facilitate the firing of said display cells when operating potentials are applied thereto [ . ],

*one operating electrode of each of said auxiliary cells being connected electrically in common with one of said column electrodes.*

7. The display device defined in claim 6 wherein said auxiliary cells [ are arrayed in ] *includes* a column *of auxiliary cells* adjacent to the first column of said display cells and in gas communication therewith whereby excited particles generated therein can reach said display cells in said first column.

8. The device defined in claim 7 wherein there is one auxiliary cell adjacent to each row of display cells.

9. The display device defined in claim 6 and including a strip of opaque material overlaying said auxiliary cells, the operating electrodes associated with said auxiliary cells being disposed beneath said opaque strip and in slots in the top and bottom surfaces of said center plate.

[ 10. The display device defined in claim 6 and including circuit means connected to said electrodes for scanning and firing said display cells column by column, and circuit means coupled to said electrodes of said auxiliary cells for simultaneously scanning and successively energizing said auxiliary cells whereby each auxiliary cell as it is fired can generate excited particles for assisting the firing of the first column of display cells.]

[ 11. The display device defined in claim 10 wherein both said circuit means are operable for energizing each column of display cells in turn in a scanning cycle and energizing each auxiliary cell as each column of display cells is energized.]

*12. A flat display panel, comprising*

*a gas-filled envelope including a face plate and a base plate closely spaced to one another and hermetically sealed together along a predetermined perimeter,*

*a plurality of groups of localized glow discharge regions, said groups being disposed side-by-side along a common plane within said envelope and each region being capable of sustaining a glow discharge which is visible through said face plate,*

*at least first and second electrodes adjacent each such visible glow discharge region, said electrodes being selectively energizable to initiate glow discharges in selective ones of said regions, and*

*a plurality of auxiliary glow discharge regions disposed in succession coplanar with said visible glow discharge regions but hidden from view through said face plate, each being adjacent and associated with one of said groups of visible glow regions to supply excited particles to the visible glow regions of the group and facilitate the initiation of glow discharge therein*

*at least two electrodes adjacent each of said auxiliary glow discharge regions to initiate glow discharges in said auxiliary regions,*

*means for sequentially energizing the electrodes of said auxiliary glow regions from the first in the succession to the last, for supplying excited particles sequentially to said visible glow region groups, and*

*means for energizing said groups of visible glow regions sequentially, one such group after another, in synchronism with the energization of said auxiliary glow discharge regions, to initiate glow in selective ones of the visible glow regions in each such group.*

*13. A display panel as in claim 12 further including plurality of conductors common to the energizing means for the visible cells and for the auxiliary cells, each of which is connected electrically to the first electrodes of all of the visible glow regions of one of said groups and to one of the electrodes of the associated auxiliary glow region.*

*14. A display panel as in claim 12 wherein, in each of the groups of visible glow regions, the first electrodes of all of the visible glow regions in that group are connected electrically in common, further including*

*a plurality of conductors each of which is electrically connected to the second electrode of one of the visible glow regions in each of said groups.*

*15. A panel as in claim 14 wherein the visible glow regions of the different groups are disposed in substantially the same pattern, and*

*wherein each of said conductors is electrically connected to the second electrode of the correspondingly-positioned visible glow regions in each of the groups.*

*16. A flat display panel, comprising*

*an envelope having a viewing window and containing an ionizable gas at a pressure capable of sustaining glow discharge,*

*a plurality of groups of localized glow discharge regions disposed side-by-side and coplanar with one another within said envelope*

*at least first and second electrodes adjacent each such localized glow region, said electrodes being selectively energizable to initiate glow discharges in selective ones of said regions,*

*at least one of the localized glow regions of each such group being adjacent the others but hidden from view through said viewing window, and serving, when energized, to supply excited gaseous particles to the other localized glow regions of the group to facilitate initiating glow discharges in such other localized glow regions, and*

*means for energizing said glow region groups sequentially, one group after another,*

*said energizing means serving to initiate glow in the hidden glow region(s) and in selective ones of the other glow regions in each such group, one group after another.*

*17. A display panel as in claim 16 wherein, in each of said groups, all of the first electrodes of the localized glow regions therein are portions of a common conductive member, and*

*wherein the energizing means comprises a plurality of conductive leads, one of which is connected electrically to each of said common conductive members.*

*18. A display panel as in claim 16 wherein the energizing means comprises a plurality of conductive leads, each of which is connected electrically to the first electrodes of all of the localized glow regions of one of said groups.*

*19. A display panel as in claim 18, further including*

*a first conductor electrically connected to the second electrode of at least one hidden glow region in each of said groups, and*

*a plurality of second conductors each of which is electrically connected to the second electrode of one of the other glow regions of each such group.*

*20. A display panel, comprising*

*a gas-filled envelope filled with an ionizable gas at a pressure capable of sustaining glow discharge and having a viewing window,*

*a plurality of groups of first electrodes disposed side-by-side within said envelope, with a discrete glow discharge region in the gaseous atmosphere contiguous each such electrode to define side-by-side groups of glow discharge regions visible through said viewing window,*

*a plurality of first conductors electrically connected to said first electrodes for selectively energizing said first electrodes to initiate glow discharges in selective ones of said visible glow regions,*

*a plurality of second electrodes, each being adjacent and associated with one of said first electrode groups and its associated visible glow region group for initiating glow discharges in visible glow regions of such group,*

*a plurality of auxiliary glow discharge regions coplanar with said visible glow discharge regions but hidden from view through said viewing window, at least one being adjacent and associated with each of said visible glow region groups, to supply excited particles to the glow regions of such group and thereby facilitate the initiation of glow discharges therein, and*

*a plurality of second conductors, one connected electrically to each of said second electrodes, for energizing said second electrodes and the associated visible glow region groups sequentially, one after another, and* means for energizing the auxiliary glow regions sequentially, one after another, each at approximately the time its associated visible glow region group is being energized.

21. A display panel as in claim 20, wherein each of said first conductors is electrically connected to at least one first electrode of each of said first electrode groups, for selectively energizing the first electrodes of the respective groups, and producing glow discharges in selective ones of the contiguous visible glow regions, as the second electrodes are being sequentially energized.

22. A display panel as in claim 21, further including at least two electrodes adjacent and associated with each of said auxiliary glow discharge regions, means connecting electrically in common one electrode of each of said auxiliary glow discharge regions, and means electrically connecting another electrode of each said auxiliary glow discharge region to the second electrode of the associated group of visible glow discharge regions.

23. A display panel as in claim 21 wherein there are two auxiliary glow discharge regions adjacent and associated with each visible glow region group, and wherein said auxiliary glow discharge regions are energized two at a time, the two auxiliary glow discharge regions associated with each visible glow region group being energized at approximately the time the visible glow regions of such group are energized.

24. A display panel as in claim 21, further including a channel interconnecting at least one auxiliary glow discharge region associated with each of the visible glow region groups.

25. A display panel as in claim 21 wherein the sequential energization of the second electrodes and visible glow region groups begins with the group at one end of said side-by-side groups, further including an additional auxiliary glow discharge region hidden from view through said viewing window, said additional auxiliary glow discharge region being located adjacent and associated with the visible glow region group at said one end, to facilitate the initiation of glow in the visible glow regions of said group each time said sequential energization begins or repeats.

26. A display panel as in claim 25 further including at least two electrodes adjacent and operative with said additional auxiliary glow discharge region, and a third conductor connected to one of the electrodes of said additional auxiliary glow discharge region for sequentially energizing said one electrode with the sequential energization of the second electrodes, to energize said one electrode just before energizing the second electrode associated with the visible glow region group at said one end.

27. A display panel, comprising a gas-tight envelope filled with an ionizable gas at a pressure capable of sustaining glow discharge and having a viewing window, a plurality of groups of first electrodes within said envelope, with a discrete glow discharge region in the gaseous atmosphere contiguous each such electrode, said first electrode groups being disposed side-by-side to define side-by-side groups of glow discharge regions visible through said viewing window, a plurality of first conductors each electrically connected to a first electrode in each of said first electrode groups, so that selective combinations of the glow discharge regions contiguous each first electrode group can be activated by a predetermined energization of said conductors, a plurality of second electrodes one positioned in operative relation with each group of first electrodes and the associated group of glow discharge regions, a plurality of auxiliary glow discharge regions coplanar with said visible glow discharge regions but hidden from view through said viewing window, at least one associated with each of said groups of visible glow discharge regions, a plurality of second conductors one of which is connected to each of said second electrodes for energizing said second electrodes sequentially, one after another, while said first conductors are being selectively energized, to produce selective glow discharge patterns sequentially in the different groups of visible glow discharge regions, and means for energizing said auxiliary glow discharge regions sequentially, one after another, in synchronism with the sequential energization of said second electrodes.

28. A display panel as in claim 27 wherein each of said auxiliary glow discharge regions, when energized, produces charged gaseous particles which facilitate the initiation of glow discharges in its associated visible glow region group, and wherein said energizing means for said auxiliary glow discharge regions energizes each such region approximately as its associated visible glow region group is being energized.

29. A display panel as in claim 28, further including a channel interconnecting at least one auxiliary glow discharge region associated with each of the visible glow region groups.

30. A display panel as in claim 29 wherein the sequential energization of the second electrodes and visible glow region groups begins with the group at one end of said side-by-side groups, further including an additional auxiliary glow discharge region hidden from view through said viewing window, said additional auxiliary glow discharge region being located adjacent and associated with the visible glow region group at said one end, to facilitate the initiation of glow in the visible glow regions of said group each time said sequential energization begins or repeats.

31. A flat display panel, comprising an envelope having a viewing window and containing an ionizable gas at a pressure capable of sustaining glow discharge, a plurality of groups of localized glow discharge regions disposed side-by-side and coplanar with one another within said envelope, at least first and second electrodes adjacent each such localized glow region, said electrodes being selectively energizable to initiate glow discharge in selective ones of said regions, at least one of the localized glow regions of each such group being hidden from view through said viewing window and being in gas coupling and priming relationship to at least one other localized glow region of the group, and means for energizing said glow region groups sequentially, one group after another, said energizing means serving to initiate glow in the hidden glow region and in selective ones of the other

*glow regions in each such group, one group after another.*

*32. A display panel, comprising*

*a gas-filled envelope filled with an ionizable gas at a pressure capable of sustaining glow discharge and having a viewing window,*

*a plurality of groups of first electrodes disposed side-by-side within said envelope, with a discrete glow discharge region in the gaseous atmosphere contiguous each such electrode to define side-by-side groups of glow discharge regions visible through said viewing window,*

*a plurality of first conductors electrically connected to said first electrodes for selectively energizing said first electrodes to initiate glow discharges in selective ones of said visible glow regions,*

*a plurality of second electrodes, each being adjacent and associated with one of said first electrode groups and its associated visible glow region group for initiating glow discharges in visible glow regions of such group,*

*a plurality of auxiliary glow discharge regions coplanar with said visible glow discharge regions but hidden from view through said viewing window, at least one being adjacent and associated with each of said visible glow region groups,*

*a plurality of second conductors, one connected electrically to each of said second electrodes, for energizing said second electrodes and the associated visible glow region groups sequentially, one after another, and*

*means for energizing the auxiliary glow regions sequentially, one after another, each at approximately the time its associated visible glow region group is being energized.*

*33. A flat display panel, comprising*

*a gas-filled envelope including a face plate and a base plate closely spaced to one another and hermetically sealed together along a predetermined perimeter,*

*a plurality of groups of localized glow discharge regions, said groups being disposed side-by-side within said envelope and each region being capable of sustaining a glow discharge which is visible through said face plate,*

*at least first and second electrodes adjacent each such visible glow discharge region, said electrodes being selectively energizable to initiate glow discharges in selective ones of said regions,*

*an elongated auxiliary glow discharge region coplanar with said visible glow discharge regions but hidden from view through said face plate and extending along the length of said panel adjacent to all of said groups of localized glow discharge regions and having a portion associated with, and in gas communication with, each of said groups of visible glow regions to supply excited particles to the visible glow regions of the group and facilitate the initiation of glow discharge therein, and*

*means for energizing said groups of visible glow regions sequentially, one such group after another, to initiate glow in selective ones of the visible glow regions in each such group.*

*34. A flat display panel, comprising*

*a gas-filled envelope including a face plate and a base plate closely spaced to one another and hermetically sealed together along a predetermined perimeter,*

*a plurality of groups of localized glow discharge regions, said groups being disposed side-by-side within said envelope and each region being capable of sustaining a glow discharge which is visible through said face plate,*

*at least first and second electrodes adjacent each such visible glow discharge region, said electrodes being selectively energizable to initiate glow discharges in selective ones of said regions,*

*a plurality of auxiliary glow discharge regions coplanar with said visible glow discharge regions but hidden from view through said face plate aligned along the length of said panel adjacent to said groups of localized glow discharge regions, each such auxiliary glow discharge region being associated with one of said groups of visible glow regions to supply excited particles to the visible glow regions of the group and facilitate the initiation of glow discharge therein, and*

*means for energizing said auxiliary glow discharge regions and said visible glow discharge region groups sequentially to initiate glow in selective ones of the visible glow regions in each such group.*

* * * * *